Aug. 23, 1960 W. L. JOHANNESEN 2,949,717
PICKUP MECHANISM FOR HARVESTERS
Filed Aug. 21, 1958 3 Sheets-Sheet 2
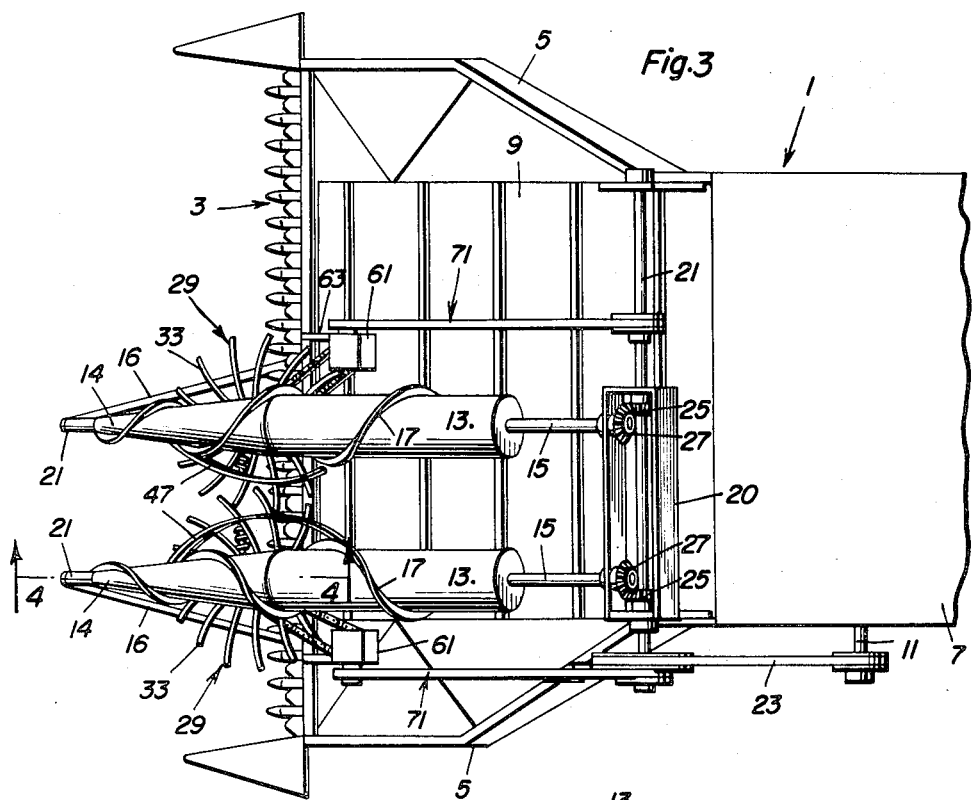
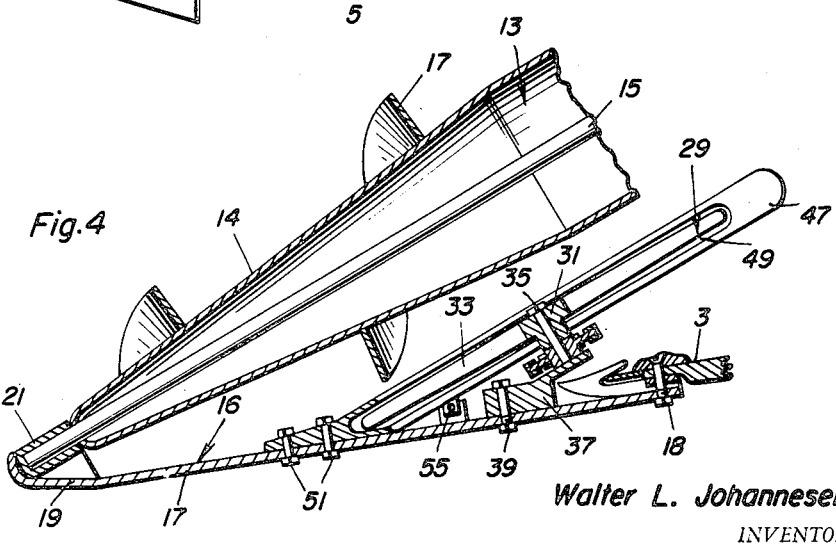
Walter L. Johannesen
INVENTOR.

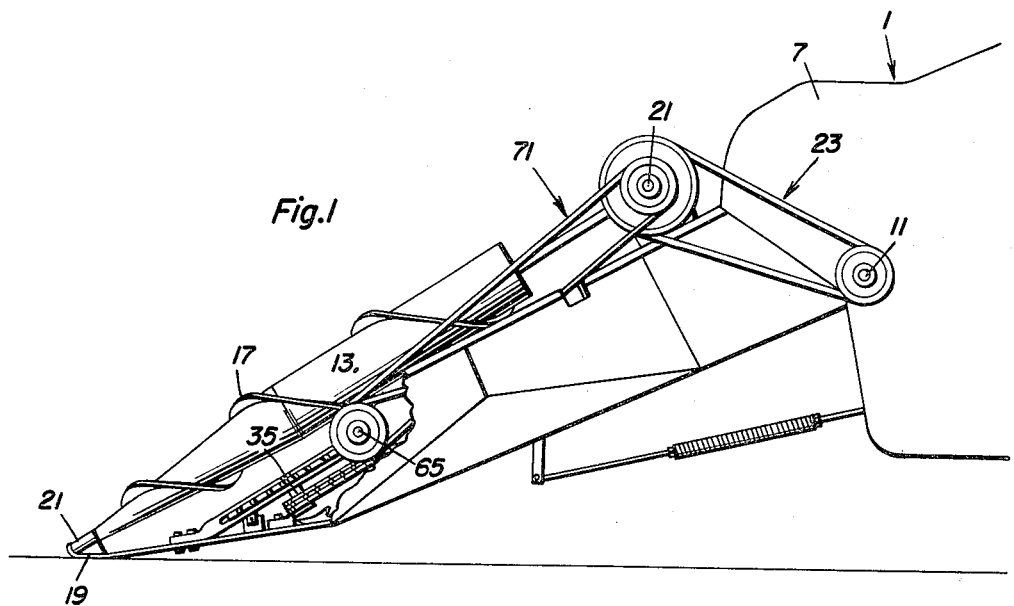
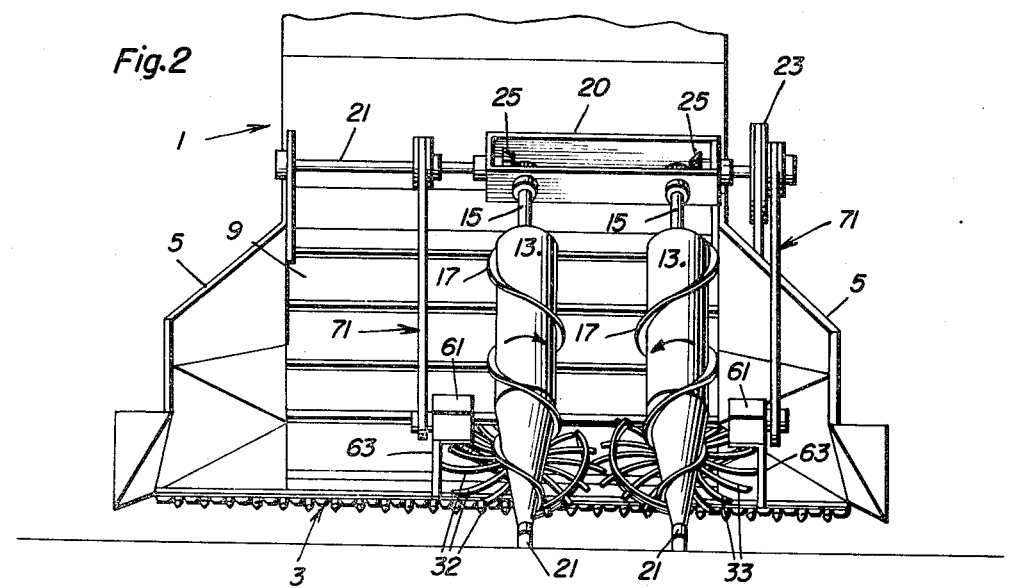
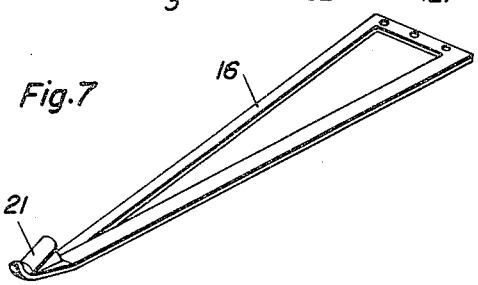

Aug. 23, 1960 W. L. JOHANNESEN 2,949,717
PICKUP MECHANISM FOR HARVESTERS
Filed Aug. 21, 1958 3 Sheets-Sheet 3
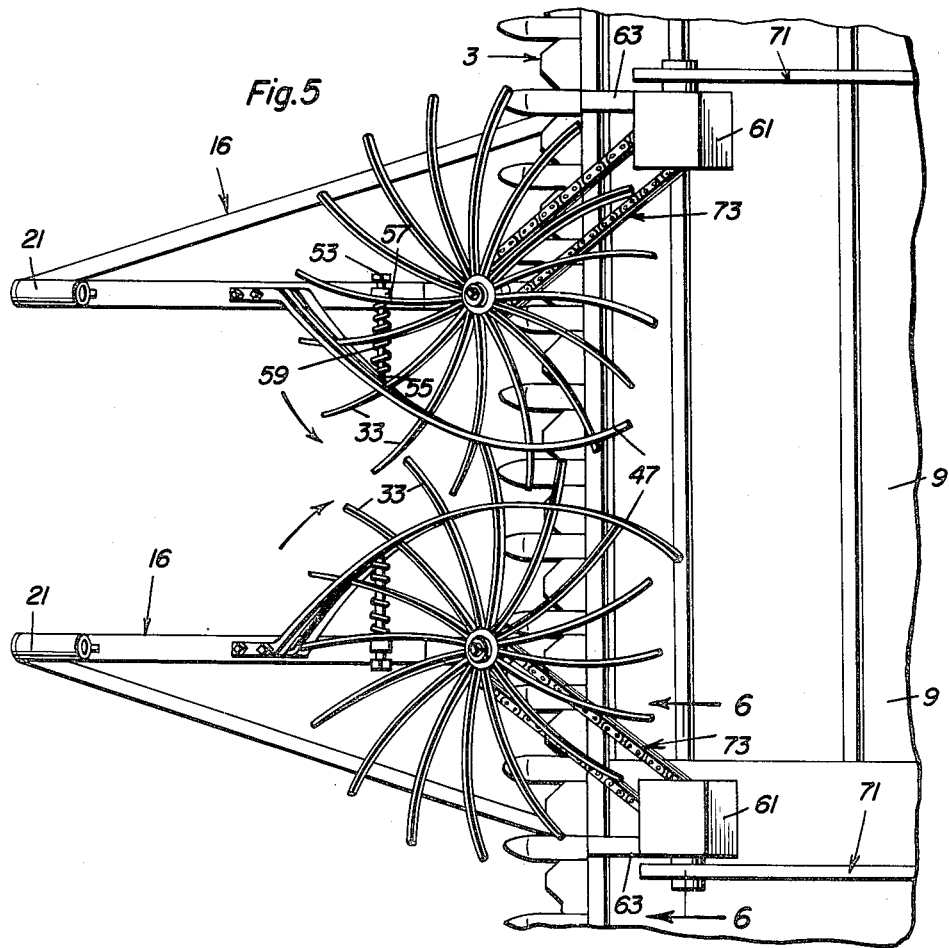
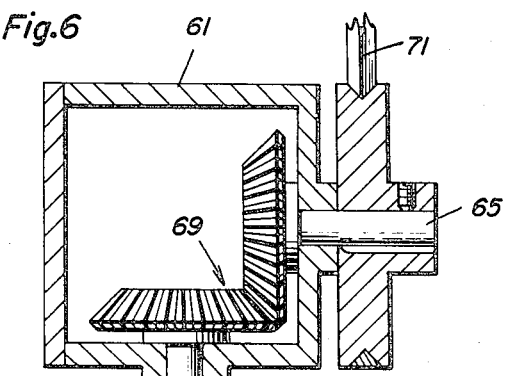
Walter L. Johannesen
INVENTOR.
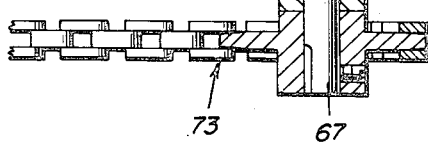

United States Patent Office

2,949,717
Patented Aug. 23, 1960

2,949,717

PICKUP MECHANISM FOR HARVESTERS

Walter L. Johannesen, Alta, Iowa

Filed Aug. 21, 1958, Ser. No. 756,390

6 Claims. (Cl. 56—23)

This invention relates to improvements in pickup mechanism for attachment to combine harvesters, and the like.

As is well known, grain in the field is frequently beaten down to the ground by wind, rain or hail, so that the sickle bar of combine harvesters which cuts substantially six to eight inches above the ground, passes over the fallen grain which is thus lost in harvesting.

The primary object of this invention is to provide such harvesters in harvesting especially row crops, such as sorghum, mechanism for picking up in advance of the sickle bar, such fallen crops, straightening the same up for cutting by the sickle bar, and pushing the cut crop down on the conveyor of the harvester for feeding from the sickle bar to the combine hopper.

Another object is to provide mechanism for the above purposes which is of simple, practical construction and attachable to present day combine harvesters without alteration in the base structure of the harvester.

To the accomplishment of the foregoing, and other objects presently appearing, the mechanism of this invention comprises, generally speaking, a pair of pickup and conveyor rolls for each row of crops and having tapered nose portions, means rotatably mounting the pair of rollers on the harvester in side by side, spaced apart relation, to incline upwardly and rearwardly over the sickle bar and conveyor in straddling relation to a row of crops with the nose portions of the pickup and conveyor rolls in front of and below the sickle bar, close to the ground to pick up crops at the ground in front of the sickle bar, the pickup and conveyor rolls being constructed and arranged to feed the picked up crop between the pair rearwardly and push it down toward the conveyor, upon rotation of the pickup and conveyor rolls in opposite directions with respect to each other, drive means for rotating the pickup and conveyor rolls, a pair of rotary bladed stock gathering and roll stripping members beneath the pair of pickup and conveyor rolls for gathering and pushing the picked up crop into the sickle bar below the pickup and conveyor rolls, means for rotating the members, and means for stripping said members clean, all as set forth in the following description, defined in the appended claims, and illustrated in the accompanying drawings, in which:

Figure 1 is a fragmentary view in side elevation of the improved pickup mechanism attached to a combine harvester;

Figure 2 is a view in front elevation of the same;

Figure 3 is a view in plan;

Figure 4 is an enlarged fragmentary view in vertical longitudinal section taken on the line 4—4 of Figure 3;

Figure 5 is an enlarged fragmentary plan view with the pickup and conveyor rolls and a drive therefor eliminated to more clearly illustrate parts thereunder;

Figure 6 is an enlarged view in vertical section taken on the line 6—6 of Figure 5, and Figure 7 is an enlarged view in perspective of a runner frame for supporting one of the pickup and conveyor rolls.

Referring to the drawings by numerals, 1 designates a combine harvester, shown fragmentarily as sufficient for the present purposes, and with the pickup mechanism of this invention attached thereto, the harvester 1 comprising the conventional front sickle bar 3 extending between side frame members 5 of the harvester 1 forwardly of the combine hopper 7 to which stock cut by the sickle bar 3 is conveyed by an upwardly and rearwardly inclined endless apron conveyor 9. A conveyor drive shaft 11 of the conveyor 9 projects outwardly of the hopper 7 and will presently be referred to in detail.

The pickup mechanism comprises a pair of pickup and conveyor rolls for each row of crops, one pair 13 of which has been shown, only, as sufficient to an understanding of the invention.

The pair of pickup and conveyor rolls 13 are elongated and mounted to incline upwardly and rearwardly over the sickle bar 3 and conveyor 11 in side by side row straddling relation, by means presently described, and each of the rolls 13 comprises a front, forwardly tapering elongated nose portion 14 projecting in advance of the sickle bar 3 below said bar and close to the ground, and a spiral blade 17 extending substantially throughout the length of the roll, the spiral blades 17 being pitched oppositely, relatively, and so that rotation of said rolls in opposite directions with respect to each other, clockwise and counterclockwise as viewed in Figure 2 will cause crop cut by the sickle bar free to be conveyed rearwardly over the conveyor 9 and forced downwardly toward said conveyor 9.

Mounting means for the pickup and conveyor rolls 13 comprises the following. A pair of roll supporting shafts 15 extend longitudinally through and outwardly of the ends of said rolls 13 which are axial thereto and to which said rolls are suitably fixed. A pair of V-shaped forwardly tapering runner frames 16 are bolted, as at 18, to the underside of the sickle bar 3 in forwardly and downwardly inclined position to engage front ends 19 thereof with the ground at opposite sides of a row of crops and are provided on top of said ends 19 with sleeve bearings 21 in which the shafts 15 are journaled forwardly of the nose portions 14. The shafts 15 are journaled rearwardly of said rolls 13 in a box frame 20 supported by a jack shaft 21 journaled through said frame transversely of and above the conveyor 9 and in bearing brackets 22 suitably fixed to and rising from the side frame members 5. As will presently appear, the shaft 21 forms part of the drive means force for the pickup and conveyor rolls 13 and which will now be described.

The drive means for the pickup and conveyor rolls 13 further comprises a belt and pulley connection from the before-mentioned shaft 11 to one end of the jack shaft 21, and a pair of beveled gears fixed on the jack shaft 21, within the frame 19 and meshing with complemental bevel gears 27 fixed on the rear ends of the roll supporting shafts 15 within said frame 20, said gears driving said shaft 15 oppositely relatively in the directions previously set forth. One end 27 of the frame 20 is confined between one of the bearing brackets 22 and one of the bevel gears 25 against end play on said jack shaft 21.

The stock gathering and roll stripping members comprise a pair of spiders 29 having hubs, as at 31 and substantially radially projecting coplanar blade arms 33 on said hubs. The spiders 29 are rotatably mounted under said rolls 13, respectively, on forwardly and upwardly inclined spindles 35 to project forwarly and rearwardly over the sickle bar 3 and over the conveyor 9 and rotate in upwardly and rearwardly inclined planes with the arms 33 of each spider 29 interlapping those of the other spider midway between the pair of pickup and conveyor rolls 13. The spindles 35 are fixed in upstanding position on brackets, as at 37, bolted, as at 39 on the runner frames 16.

A pair of longitudinally curved stripper and cleaner blades 47, for the spiders 29, with longitudinal slots, as at 49, through which the arms 33 of the spiders 29 revolve and project are bolted, at front ends thereof as at 51, to the runner frames 16 in advance of the spiders 29 and extend between the hubs 31 of said spiders 29 rearwardly in opposite spaced and rearwardly converging relation over the sickle bar 3 and conveyor 9. The stripper and cleaner blades 47 provide a gap therebetween midway between the pickup and conveyor rolls 13, and are bowed toward each other and resilient for yielding in a separative direction for varying the spacing between the same as may be required to pass crops between said blades. Guide bolts 53 terminally suitably attached to said blades, as at 55, and sliding in lugs 57 on the frames 16 with blade loading helical springs 59 thereon, further tension blades 47 against separative movement.

The pair of spiders 29, which is to say the pair of gathering and roll stripping members, are rotated oppositely with respect to each other counter-clockwise and clockwise, as viewed in Figure 3, to pass crops therebetween to the sickle bar 3 and conveyor 9 and are rotated by drive means as follows.

A pair of gear boxes 61 are mounted above the conveyor 9 at opposite sides of the pair of pickup and conveyor rolls 13 on brackets 63 suitably fixed to the sickle bar 3 and extending rearwardly in overlying relation thereto and to the conveyor 9. A rotatable stub shaft 65 extends horizontally out of one side of each box 61 and an upright shaft 67 rotatably depends out of the bottom of each box and the shaft 65 is operatively connected to the shaft 67 by a bevel gearing 69 in the box, all as best shown in Figure 6 in connection with one of the boxes 61. The jack shaft 21 drives the horizontal shafts 65 by means of belt and pulley connections 71 between said jack shaft 21 and said shafts 65. The upright shafts 67 drive the spiders 29 by means of sprocket and chain connections 73 between said shafts 65 and the spindles 35.

The operation of the invention is as follows: The nose portions 14 of the pickup and conveyor rolls 13 pick up the fallen crops in a row at opposite sides of said row and the blades 17 act to convey the crop rearwardly and force the same downwardly while the spiders 29 of the gathering and roll stripper members function to gather and feed the picked up crop between said rolls in straightened condition to the sickle bar 3 for cutting and forcing of the cut stock down onto the conveyor 9 by the blades 17. The spiders 29 during this operation also function to strip the pickup and conveyor rolls 13 of any stock adhering thereto and tending to wind thereon. The stripper and cleaner blades 47 maintain the spiders 29 clean of any stock tending to adhere or wind thereon and supplement the spiders 29 in gathering the stock and guiding it between the pickup and conveyor rolls 13.

As will be understood, several of the described mechanisms may be provided and spaced apart transversely of the sickle bar 3 and conveyor 9 for use with several rows of crops and the mechanism is adapted for use in harvesting other than row crops and on different types of harvesting machines, for instance corn harvesters.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a harvester including a front sickle bar, side frames supporting said bar, a rearwardly traveling conveyor behind the sickle bar and a driven shaft, a pair of elongated pickup and conveyor rolls having elongated front noses and spiral blades thereon pitched oppositely on each of said rolls with respect to those on the other roll to feed a row crop rearwardly between said rolls in response to rotation of said rolls in opposite direction each with respect to the other, means mounting said rolls in side by side spaced apart relation to incline upwardly and rearwardly over said bar and conveyor comprising a pair of runner frames below and on said bar, means journaling said noses on said frames below and in front of said bar whereby said noses will pick up and straighten fallen crops in advance of said bar in a row straddled by said pair of rolls for cutting by said bar and conveying by said blades over and onto said conveyor, drive means in the rear of said rolls for rotating the same and to which said shaft is operatively connected, and a pair of rotary bladed crop gathering and roll stripping spiders, means mounting said pair of spiders beneath said rolls respectively for rotation in upwardly and rearwardly inclined planes and in forwardly and rearwardly extending relation to said bar with the blades in the pair interlapping between said rolls to gather the straightened crops and force the same into said sickle bar and to strip said rolls in response to rotation of said spiders oppositely relative to each other, and means for rotating said spiders operated by said drive means.

2. The combination of claim 1 and a pair of longitudinally slotted stripper blades mounted on said sickle bar and through which said spiders extend and rotate for stripping thereof.

3. The combination of claim 2, said stripper blades being opposite each other and bowed toward each other to provide a gap therebetween midway between the pickup rolls for the passage of grain between said stripper blades to said conveyor.

4. In a harvester, the combination of a supporting frame, a front sickle bar extending transversely of said frame, a crop conveyor extending rearwardly from said sickle bar, a pair of elongated pickup and conveyor rolls mounted on said frame in transversely spaced relation, said rolls having tapered front noses and being provided with oppositely pitched spiral blades, the noses of said rolls being disposed forwardly of the sickle bar with the rolls being rearwardly inclined to extend over the sickle bar and above said conveyor, means for rotating said rolls in opposite directions whereby the noses thereof may pick up and straighten fallen crop for feeding by said blades rearwardly between said rolls, a pair of rotary bladed crop gathering and roll stripping spiders mounted below the respective rolls above the sickle bar, the blades of said spiders interlapping between said rolls to gather the straightened crop and force the same into the sickle bar and to strip said rolls by rotation of the spiders in opposite directions, and means for rotating said spiders.

5. The device as defined in claim 4 together with a pair of elongated and longitudinally slotted stripper blades mounted above said sickle bar and providing a gap therebetween midway between said rolls for the passage of crop to said conveyor, the blades of said spiders projecting through the slots of said stripper blades into said gap.

6. The device as defined in claim 5 wherein said stripper blades are resiliently yieldable apart from each other to widen said gap by the passage of crop therethrough.

References Cited in the file of this patent

UNITED STATES PATENTS

| | | |
|---|---|---|
| 927,039 | Griffin | July 6, 1909 |
| 1,108,341 | Cross | Aug. 25, 1914 |
| 2,498,093 | Paradise et al. | Feb. 20, 1950 |
| 2,835,097 | Sullivan | May 20, 1958 |
| 2,836,026 | Gray et al. | May 27, 1958 |